United States Patent
Mochizuki (10) Patent No.: US 9,049,606 B2
(45) Date of Patent: Jun. 2, 2015

(54) SELF-DIAGNOSIS CIRCUIT

(71) Applicant: YOKOGAWA ELECTRIC CORPORATION, Musashino-shi, Tokyo (JP)

(72) Inventor: Satoshi Mochizuki, Musashino (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 238 days.

(21) Appl. No.: 13/870,747

(22) Filed: Apr. 25, 2013

(65) Prior Publication Data

US 2013/0288609 A1    Oct. 31, 2013

(30) Foreign Application Priority Data

Apr. 27, 2012  (JP) ................. 2012-102591

(51) Int. Cl.
H04B 17/00        (2006.01)
H04W 24/00        (2009.01)

(52) U.S. Cl.
CPC ............ H04W 24/00 (2013.01); H04B 17/17 (2015.01); H04B 17/19 (2015.01)

(58) Field of Classification Search
CPC ........ H04B 17/17; H04B 17/19; H04W 24/00
See application file for complete search history.

(56) References Cited

U.S. PATENT DOCUMENTS

2009/0310662 A1*  12/2009  Kato et al. ................. 375/224

FOREIGN PATENT DOCUMENTS

| JP | 05-172879 A    | 7/1993 |
| JP | 2000-36767 A   | 2/2000 |
| JP | 2002-043957 A  | 2/2002 |
| JP | 2011-139283 A  | 7/2011 |
| JP | 2011-193151 A  | 9/2011 |

* cited by examiner

*Primary Examiner* — David Bilodeau
(74) *Attorney, Agent, or Firm* — Sughrue Mion, PLLC (57) ABSTRACT

A self-diagnosis circuit is coupled to a signal transmission path between a high-frequency signal input part and an output part and is configured to diagnose a high-frequency circuit using a signal that propagates along the signal transmission path. The self-diagnosis circuit includes a detector configured to detect the high-frequency signal propagating along the signal transmission path from the output part toward the input part; and a diagnosis unit that diagnoses for an abnormality in the follower stage of the high-frequency circuit disposed between a coupling part of the self-diagnosis circuit with respect to the signal transmission path and the output part, in accordance with the detection result of the detector.

20 Claims, 4 Drawing Sheets

SELF-DIAGNOSIS CIRCUIT

BACKGROUND OF THE INVENTION

1. Field of the Invention

The present invention relates to a self-diagnosis circuit that diagnoses for an abnormality in a high-frequency circuit.

Priority is claimed on Japanese Patent Application No. 2012-102591, filed Apr. 27, 2012, the content of which is incorporated herein by reference.

2. Description of the Related Art

Wireless communication apparatuses have been commonly used in recent years in various fields because the wireless communication apparatuses have the advantages of not requiring the laying of communication lines, and can be easily installed in locations in which the laying of communication lines is difficult or the laying construction is uneconomical. For example, in plants and factories, on-site equipment (measuring instruments and actuators) capable of wireless communication and referred to as wireless field devices are used as the above-noted wireless communication apparatuses, with measurement signals indicating measurement results from wireless field devices and control signals for controlling the operation of wireless field devices being transmitted and received by wireless communication.

When an abnormality such as misoperation or a failure occurs in such a wireless communication apparatus, in order to facilitate quick notification of the occurrence of the abnormality and identification of the cause thereof, a self-diagnosis circuit is provided to diagnosis for the existence an abnormality in the high-frequency circuit provided therewithin. This self-diagnosis circuit is provided, for example, in the transmitting circuit that transmits wireless signals, or in the transmitting and receiving circuit that transmit and receive wireless signals, and splits off a part of a high-frequency signal that propagates along the signal transmission path toward the antenna, and diagnoses for an abnormality, in accordance with the magnitude of the signal level of the split-off high-frequency signal.

Japanese Laid-open Patent Publication No. 2000-36767 discloses an example of a self-diagnosis circuit that diagnoses whether or not the high-frequency circuitry (pre-amplifier, power amplifier, and attenuator) of a transmitter is normal. Specifically, in Japanese Laid-open Patent Publication No. 2000-36767, self-diagnosis is done before transmission to detect the amplitude value of the various outputs of the high-frequency circuitry, and by comparing the various output amplitude values with normal amplitude values, a judgment is made as to whether or not the various circuits of the high-frequency circuitry are normal.

A conventional self-diagnosis circuit, as described above, basically diagnoses for an abnormality in accordance with the magnitude of the signal level of a high-frequency signal that propagates along the signal transmission path toward the antenna. For this reason, although it is possible to detect an abnormality in the previous stage included in the high-frequency circuit provided in a wireless communication apparatus, it is difficult to detect an abnormality in the follower stage. In this case the previous stage included in the high-frequency circuit refers to the circuitry from the input part to which the high-frequency signal is input up to the part in which the self-diagnosis circuit is provided, and the follower stage included in the high-frequency circuit refers to the circuitry from the part in which the self-diagnosis circuit is provided up until the output part from which the high-frequency signal is output (or up to the antenna).

Conventional wireless communication apparatuses often have an LCD (liquid-crystal display) to display the diagnosis result of the self-diagnosis circuit on the LCD, and to give notification that an abnormality has occurred. However, wireless communication apparatuses are often installed in locations at a distance from the communication destination to which the communication is intended, and when a wireless communication apparatus is installed in an out-of-the way outdoor location, it is difficult to quickly discover that an abnormality has occurred. In particular, in the above-described wireless field devices, because there are times when they are installed at distances as much as several hundred meters to several kilometers, unless patrols are frequently made to visit the wireless field devices, it is not possible to know of the occurrence of an abnormality.

Some aspects of the present invention are to provide a self-diagnosis circuit for diagnosing for abnormalities, not only in the previous stage, but also in the follower stage included in a high-frequency circuit, and for facilitating knowledge of the occurrence of the abnormality.

SUMMARY

A self-diagnosis circuit of one aspect of the present invention is coupled to a signal transmission path between a high-frequency signal input part and an output part and is configured to diagnose a high-frequency circuit using a signal that propagates along the signal transmission path. The self-diagnosis circuit includes a detector configured to detect the high-frequency signal propagating along the signal transmission path from the output part toward the input part; and a diagnosis unit that diagnoses for an abnormality in the follower stage included in the high-frequency circuit disposed between a coupling part of the self-diagnosis circuit with respect to the signal transmission path and the output part, in accordance with the detection result of the detector.

According to some aspects of the present invention, the high-frequency signal propagating along the signal transmission path from the output part toward the input part is detected by the detector, and a diagnosis for an abnormality in the follower stage included in the high-frequency circuit (the part disposed between the coupling part of the self-diagnosis circuit with respect to the signal transmission path and the output part) is made, in accordance with the detection result of the detector.

In the self-diagnosis circuit of some aspects of the present invention, the diagnosis unit uses the detection result of the detector to determine the reflection characteristics of the high-frequency signal that has propagated from the input part in the follower stage included in the high-frequency circuit, and diagnoses for an abnormality in the follower stage included in the high-frequency circuit, based on the reflection characteristics.

In the self-diagnosis circuit of some aspects of the present invention, the detector has a first pattern formed on the signal transmission path and functions as an antenna that radiates a high-frequency signal propagating along the signal transmission path, a second pattern that is electromagnetically coupled to the first pattern, and the detection element is configured to detect the high-frequency signal propagated from the first pattern to the second pattern.

The self-diagnosis circuit of some aspects of the present invention further includes a switch that establishes a connected state or a disconnected state between an end part in the output part side of the first pattern and the signal transmission path, wherein, if an abnormality is diagnosed in the follower stage included in the high-frequency circuit, the diagnosis unit controls the switch so as to establish the disconnected state between the end part of the output part of the first pattern and the signal transmission path, causing the first pattern to function as an antenna.

In the self-diagnosis circuit of some aspects of the present invention, the detector has a third pattern that can change the electromagnetic coupling force of the second pattern with respect to the first pattern.

In the self-diagnosis circuit of some aspects of the present invention, if the diagnosis unit diagnoses an abnormality in the follower stage of the high-frequency circuit, the third pattern is used to weaken the electromagnetic coupling force of the second pattern with respect to the first pattern.

In the self-diagnosis circuit of some aspects of the present invention, the detector is also configured to detect a high-frequency signal propagating along the signal transmission path from the input part toward the output part, and the diagnosis unit is configured to determine the transmission characteristics of the previous stage included in the high-frequency circuit disposed between the coupling part of the self-diagnosis circuit with respect to the signal transmission path and the input part thereof, using the detection result of the detector, and to diagnose for an abnormality in the previous stage included in the high-frequency circuit, based on the transmission characteristics.

In the self-diagnosis circuit of some aspects of the present invention, the output part is an input/output part configured to, in addition to outputting a high-frequency, allow an input of a high-frequency signal, and the self-diagnosis circuit has a detection circuit configured to detect a high-frequency signal input from the input/output part and propagated along at least a part of the follower stage of the high-frequency circuit.

In a self-diagnosis circuit of some aspects of the present invention, at least the detector is formed in a single chip or a module.

According to of some aspects of the present invention, by detecting the high-frequency signal that propagates along the signal transmission path from the output part toward the input part by the detector and by diagnosing for the existence of an abnormality in the follower stage of the high-frequency circuit according to the detection results of the detector (portion of the output part side from the coupling part of the self-diagnosis circuit with respect the signal transmission path), it is possible to enable diagnosis of an abnormality, not only in the previous stage included in the high-frequency circuit, but also in the follower stage thereof.

Also, according to the embodiment, a first pattern configured to function as an antenna that radiates the high-frequency signal propagating along the signal transmission path is formed on the signal transmission path and is provided in the detector, and when an abnormality is diagnosed, because the first pattern is used to send a notification signal, it is possible to easily know that an abnormality has occurred.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The self-diagnosis circuit according to embodiments of the present invention will be described in detail below, with references being made to the drawings.

First Embodiment

Figure 1:
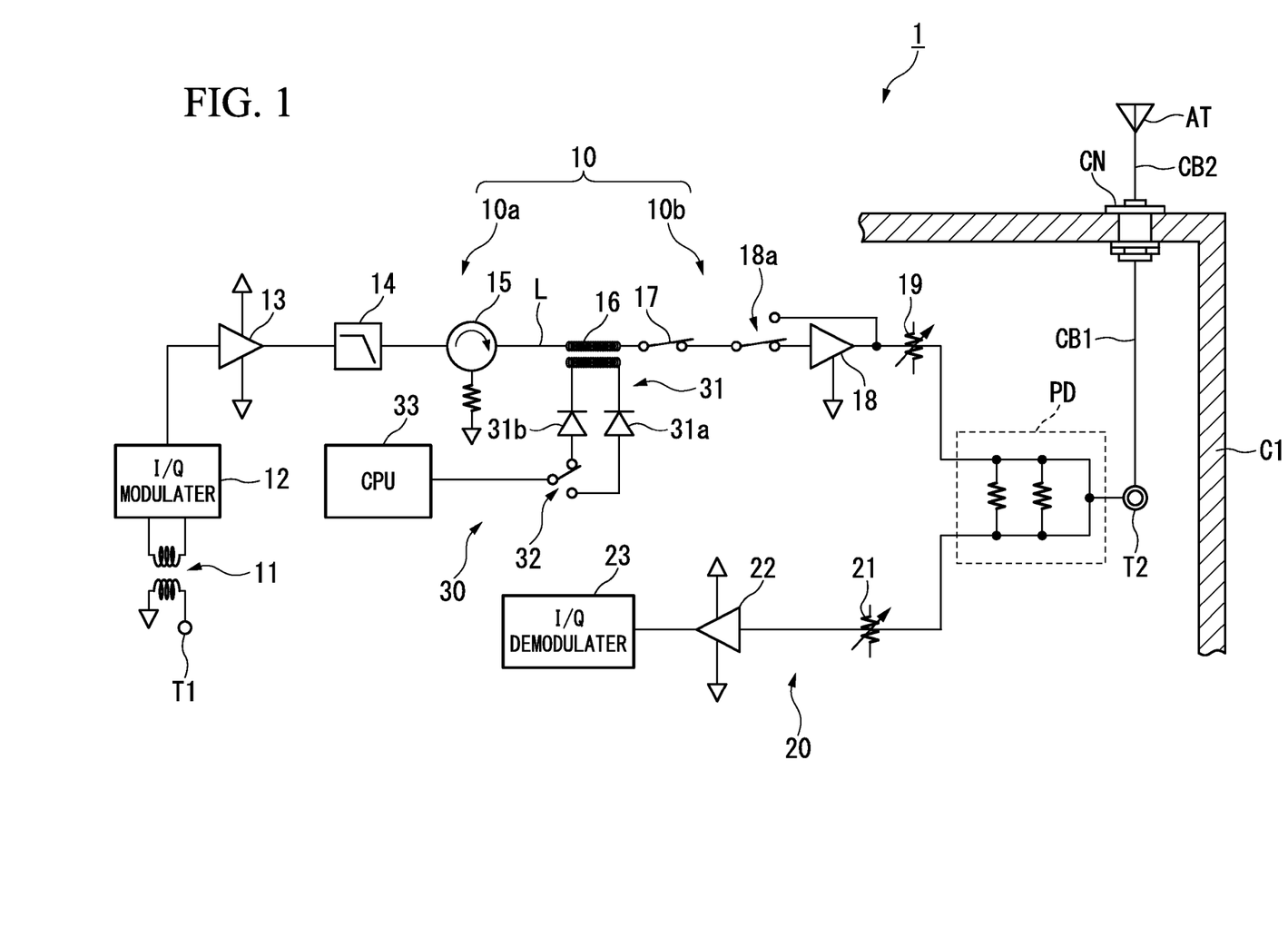
FIG. 1 is a block diagram showing the constitution of the main parts of a wireless communication apparatus having a self-diagnosis circuit according to a first embodiment of the present invention.

FIG. 1 is a block diagram showing the constitution of the main parts of a wireless communication apparatus having a self-diagnosis circuit according to the first embodiment of the present invention. As shown in FIG. 1, the wireless communication apparatus 1 of the present embodiment includes a transmitting circuit 10 (high-frequency circuit), a receiving circuit 20, a self-diagnosis circuit 30, a power divider PD, and an antenna AT (output part) and the like, wherein the signal (high-frequency signal) input from an input terminal T1 (input part) is transmitted as a wireless signal from the antenna AT, and receiving processing and the like is performed of a wireless signal received by the antenna AT.

The wireless communication apparatus 1 can diagnosis for an abnormality in the high-frequency circuit made of the transmitting circuit 10, the power divider PD, and the antenna AT and the like. If the diagnosis is that an abnormality exists, the wireless communication apparatus 1 can send a wireless signal (notification signal) that gives notification thereof, using the antenna AT or not using the antenna AT. The wireless communication apparatus 1 is provided, for example, in a wireless field device installed in a plant, a factory, or the like, and the frequency of the signal input from the input terminal T1 is approximately several gigahertz.

The transmitting circuit 10 has a high-frequency transformer 11, an I/Q modulator 12, a pre-amplifier 13, a lowpass filter 14, an isolator 15, a bidirectional coupler 16 (coupling part), a switch 17, a power amplifier 18, a switch 18a, and a variable attenuator 19, and generates a transmitted signal by performing amplification, modulation, and the like of the signal input from the input terminal T1. The high-frequency transformer 11 converts the signal (singled-ended signal) input from the input terminal T1 to a differential signal. The I/Q modulator 12, in response to the signal output from the high-frequency transformer 11, modulates the amplitude and phase of an in-phase carrier and a quadrature carrier, which are mutually independent.

The pre-amplifier 13 amplifies the signal output from the I/Q modulator 13 with a pre-established prescribed gain. The lowpass filter 14 is a filter for suppression of high frequencies included in the signal amplified by the pre-amplifier 13. The isolator 15 passes a signal directed toward the bidirectional coupler 16 from the filter 14 and cut off a signal in the opposite direction. The bidirectional coupler 16 electrically couples the signal transmission path L (the transmission path connecting from the I/Q modulator 12 to the variable attenuator 19) provided in the transmitting circuit 10 with the self-diagnosis circuit 30, and splits off a part of the signal propagated along the signal transmission path L toward the self-diagnosis circuit 30.

The switch 17 is provided on the signal transmission path L between the bidirectional coupler 16 and the power amplifier 18 and, by going into the closed or open state, places the signal transmission path L into connected or the disconnected state. The power amplifier 18 amplifies the signal that is output from the pre-amplifier 13 and then sequentially passes through from the lowpass filter 14 to the switch 17. The switch 18a provided between the switch 17 and the power amplifier 18 is a switch that switches between connecting the switch 17 to the input terminal of the power amplifier 18 and connecting the switch 17 to the output terminal of the power amplifier 18.

The variable attenuator 19 is an attenuator with a variable attenuation provided in the output stage of the transmitting circuit 10. The variable attenuator 19 is used to adjust the level of the transmitted signal output to the power divider PD from the transmitting circuit 10, or to cut off the received signal distributed at the power divider PD and input to the transmitting circuit 10 (the received signal received at the antenna AT). The I/Q modulator 12, the switch 17, the switch 18a, and the variable attenuator 19 are controlled by the CPU 33 provided in the self-diagnosis circuit 30.

The receiving circuit 20 has a variable attenuator 21, a low-noise amplifier (LNA) circuit 22, and an I/Q demodulator 23, and performs receiving processing of a wireless signal that is received at the antenna AT and passes through the power divider PD. The variable attenuator 21 is an attenuator with variable attenuation provided in the input stage of the receiving circuit 20. The variable attenuator 21 is used to adjust the level of the received signal input to the receiving circuit 20 from the power divider PD, or to cut off the transmitted signal distributed at the power divider PD and input to the receiving circuit 20. The low-noise amplifier circuit 22 amplifies the received signal, the level of which has been adjusted by the variable attenuator 21. The I/Q demodulator 23 demodulates the received signal that has been amplified by the low-noise amplifier circuit 22. The variable attenuator 21 is controlled by the CPU 33 provided in the self-diagnosis circuit 30.

The self-diagnosis circuit 30 has a detector 31, a selection switch 32, and the CPU 33 (self-diagnosis unit), and diagnoses for an abnormality in the high-frequency circuit made up by the transmitting circuit 10, the power divider PD, the antenna AT, and the like. In this case, the self-diagnosis circuit 30 can diagnosis for an abnormality not only in the previous stage circuit 10a, which is the previous stage included in the high-frequency circuit, but also in the follower stage circuit 10b, which is the follower stage of the high-frequency circuit. The previous stage circuit 10a refers to the circuit from the bidirectional coupler 16 to the circuit on the input terminal T1 side (specifically, the circuit made from the high-frequency transformer 11 to the isolator 15). In contrast, the follower stage circuit 10b refers to the circuit from the bidirectional coupler 16 to the circuit on the input/output terminal T2 side (specifically, the circuit that includes, in addition to the switch 17 to the variable attenuator 19, the power divider PD and the antenna AT).

The detector 31 has the above-described bidirectional coupler 16 and two detection elements, 31a and 31b, which detect the signals that propagate along the signal transmission path L. The detection element 31a detects the signal split off at the bidirectional coupler 16 of the signal that propagates along the signal transmission path L from the input terminal T1 toward the input/output terminal T2. In contrast, the detection element 31b detects the signal split off from the signal that propagates along the signal transmission path L from the input/output terminal T2 toward the input terminal T1, by the directional coupler 16. In this case, the signal detected by the detection element 31b is, for example, the reflection signal obtained by the reflection at the follower stage circuit 10b of the signal propagating along the signal transmission path L from the input terminal T1 toward the input/output terminal T2. The selector switch 32 is provided between the detector 31 and the CPU 33, and performs switching of the detection elements 31a and 31b to be connected to the CPU 33, under the control of the CPU 33.

The CPU 33, in response to the detection result of the detector 31, performs adjustment and the like of the levels of the transmitted signal and the received signal by controlling the I/Q modulator 12 and the variable attenuators 19 and 21. The CPU 33 also switches the selector switch 32 and uses the detection results of the detector 31 to diagnosis for the existence of an abnormality in the previous stage circuit 10a and the follower stage circuit 10b. Specifically, the CPU 33 uses the detection result of the detection element 31a provided in the detector 31 to diagnosis for an abnormality in the previous stage circuit 10a and uses the detection result of the detection element 31b to diagnosis for an abnormality in the follower stage circuit 10b.

For example, the CPU 33 determines the transmission characteristics (the transmission characteristics from the input terminal T1 side to the input/output terminal T2 side) of the previous stage circuit 10a from the detection result of the detection element 31a, and diagnoses for an abnormality in the previous stage circuit 10a, based on the transmission characteristics. The CPU 33 also calculates the voltage standing wave ratio (VSWR) from the detection result of the detection element 31b, determines the reflection characteristics of the follower stage circuit 10b (the reflection characteristics at the input terminal T1 side), and diagnoses for an abnormality in the follower stage circuit 10b, based on the reflection characteristics.

If the CPU 33 diagnoses an abnormality in either the previous stage circuit 10a or the follower stage circuit 10b, it sends a notification signal that is a wireless signal indicating that, using the antenna AT, or not using the antenna AT. For example, if abnormality is diagnosed in the previous stage circuit 10a and an abnormality is not diagnosed in the follower stage circuit 10b, a notification signal is sent using the antenna AT, and conversely, if an abnormality is not diagnosed in the previous stage circuit 10a and is diagnosed in the follower stage circuit 10b, the notification signal is sent without using the antenna AT.

If the notification signal is sent using the antenna AT, the CPU 33 places the switch 17 in the closed condition, placing the signal transmission path L between the bidirectional coupler 16 and the power amplifier 18 in the connected state. In contrast, if the notification signal is sent without using the antenna AT, the CPU 33 places the switch 17 in the open condition, placing the signal transmission path L between the bidirectional coupler 16 and the power amplifier 18 in the disconnected state. Although details of this will be described below, in the case of not using the antenna AT, a microstrip antenna that is implemented by the bidirectional coupler 16 is used to send the notification signal.

The power divider PD is a three-terminal circuit to which, for example, the transmitting circuit 10, the receiving circuit 20, and the antenna AT are connected, this circuit distributing the transmitted signal from the transmitting circuit 10 to the antenna AT and the receiving circuit 20, and distributing the received signal received by the antenna AT to the receiving circuit 20 and the transmitting circuit 10. Connection of the antenna AT is made to the power divider PD via input/output terminal T2, the cable CB1, and the extension cable CB2.

The above-noted input/output terminal T2 is a connector provided on a board (not shown) onto which, for example, the transmitting circuit 10, the receiving circuit 20, the self-diagnosis circuit 30, and the power divider PD are mounted, and to which a coaxial cable is connected. The cable CB 1 is a coaxial cable having one end connected to the input/output cable T2 and the other end connected to a connector CN provided on the enclosure C1. The extension cable CB2 is a coaxial cable having one end connected to the connector CN and another end connected to the antenna AT. If the antenna AT is mounted to the enclosure C1, the extension cable CB2 is omitted.

Figure 2:
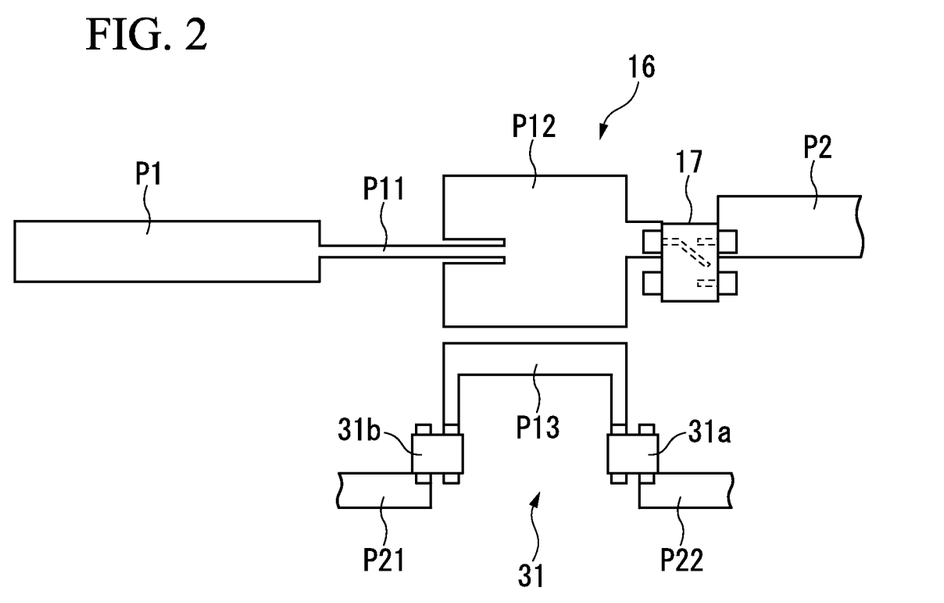
FIG. 2 is a plan view showing the constitution of a detector 31 in the first embodiment of the present invention.

Next, the detector 31, including the bidirectional coupler 16, will be described in detail. FIG. 2 is a plan view showing the constitution of the detector 31 in the first embodiment of the present invention. In FIG. 2, parts that are the same as elements shown in FIG. 1 are assigned the same reference symbols. As shown in FIG. 2, the bidirectional coupler 16, which forms a part of the detector 31 is made up of a pattern P11, a pattern P12 (first pattern), and a pattern P13 (second pattern), and is provided between the pattern P1, which forms the signal transmission path L that connects the isolator 15 and the bidirectional coupler 16, and the switch 17. The pattern P2 in FIG. 2 is a pattern that forms the signal transmission path L between the switch 17 and the switch 18a.

The pattern P11 is narrower than the patterns P1 and P2, and is a pattern that extends along the straight line in the direction in which the patterns P1 and P2 extend. The pattern P11 has one end connected to an end of the pattern P1, and another end connected to the pattern P12. The pattern P12 is a pattern having one end to which the pattern P11 is connected and another end that is a substantially rectangularly shaped pattern to which the switch 17 is connected, whereby when the switch 17 is in the closed condition the pattern P12 functions as the signal transmission path L, and when the switch 17 is in the open condition, it functions as a microstrip antenna.

The pattern 13 is a pattern disposed at a prescribed spacing from the pattern P12, and in a direction that intersects with the direction in which the patterns P1 and P2 extend. In this case, the spacing between the patterns P12 and P13 is set to a distance that electromagnetically couples the patterns P12 and P13, so that at least a part of the signal (high-frequency signal) via the pattern P12 is propagated to the pattern P13.

The detection element 31a is connected to one end of the pattern P13, and the detection element 13b is connected to the other end. The pattern P21 in FIG. 2 is a pattern that extends to one terminal of the selector switch 32 from the detection element 31b, and pattern P22 is a pattern that extends to the other terminal of the selector switch 32 from the detection element 31a.

Next, the operation of the wireless communication apparatus 1 in the above-described constitution will be described. The operation of the wireless communication apparatus 1 is generally divided into the operation (transmission operation) of performing self-diagnosis while transmitting a wireless signal from the antenna AT and the operation (receiving operation) of performing self-diagnosis while performing receiving processing of a wireless signal received at the antenna AT. In the following, the transmission operation and the receiving operation will be described in sequence.

Transmission Operation

When transmission operation begins, initial settings are first performed by control from the CPU 33. Specifically, in addition to the switch 17 being set to the closed condition, the switch 18a is set so that the switch 17 and the input end of the power amplifier 18 are in the connected state. The attenuation of the variable attenuator 19 is set to minimum, and the attenuation of the variable attenuator 21 is set to maximum. Additionally, the selector switch 32 is set so that the CPU 33 and the detection element 31a are in the connected state.

Upon completion of the above-noted initial settings, when the signal to be transmitted as a wireless signal is input to the input terminal T1, after transformation to a differential signal by the high-frequency transformer 11, it is input to the I/Q modulator 12.

By doing this, modulation is done of the amplitude and phase of an in-phase carrier and a quadrature phase carrier, which are mutual independent, and an I/Q modulated signal is output from the I/Q modulator 12. The signal output from the I/Q modulator 12 is amplified by the pre-amplifier 13 and, after suppression of high-frequency components by the low-pass filter 14, is input, via the isolator 15, to the bidirectional coupler 16.

Of the signal input to the bidirectional coupler 16, the signal that has passed through the bidirectional coupler 16 passes sequentially through the switch 17 and then the switch 18a, is amplified by the power amplifier 18, and is then input to the variable attenuator 19. In this case, because the attenuation of the variable attenuator 19 is set to minimum, the signal input to the variable attenuator 19 passes through the variable attenuator 19 and is input to the power divider PD with almost no attenuation.

The signal input to the power divider PD is distributed to the input/output terminal T2 and the receiving circuit 20.

The signal distributed to the input/output terminal T2 passes sequentially through the cable CB1 and then the extension cable CB2, and is transmitted from the antenna AT as a wireless signal. In contrast, the signal distributed to the receiving circuit 20, because the attenuation of the variable attenuator 21 is set to maximum, is almost completely attenuated.

The signal split off at the bidirectional coupler 16 propagates from the pattern P12 to the pattern P13 shown in FIG. 2, and is detected by the detection element 31a provided in the self-diagnosis circuit 30. The detection result of the detection element 31a is input to the CPU 33 via the selector switch 32, and is used in judging whether or not the signal level of the signal propagating along the signal transmission path L is proper. If a judgment is made that the signal level is not proper, the CPU 33, for example, controls the variable attenuator 19 so as to adjust the signal level.

While the foregoing operation is being performed, the CPU 33 switches the selector switch 32 at an appropriate timing. Then, based on the detection result of the detection element 31a, a judgment is made regarding an abnormality in the previous stage circuit 10a, and, based on the detection result of the detection element 31b, a judgment is made regarding an abnormality in the follower stage circuit 10b. For example, if the detection result of the detection element 31a is below a pre-established lower threshold, the CPU 33 judges that there is an abnormality in the previous stage circuit 10a, and if the detection result of the detection element 31b is above a pre-established upper threshold, the CPU 33 judges that there is an abnormality in the follower stage circuit 10b.

If a judgment is made that an abnormality has occurred in the previous stage circuit 10a, the CPU 33 places the signal transmission path L between the bidirectional coupler 16 and the power amplifier 18 in the connected state, for example, by the switch 17 and, by inputting a notification signal to the signal transmission path L from the vicinity of the bidirectional coupler 16, sends a notification signal using the antenna AT. In contrast, if a judgment is made that an abnormality has occurred in the follower stage circuit 10b, the CPU 33, for example, places the switch 17 in the open condition, so as to place the signal transmission path L between the bidirectional coupler 16 and the power amplifier 18 in the disconnected state, by inputting the notification signal from the input terminal T1, sends the notification signal, using the pattern P12 of bidirectional coupler 16, which functions as a microstrip antenna.

Receiving Operation

When the receiving operation begins, initial settings are first performed by control from the CPU 33. Specifically, in addition to the switch 17 being set to the closed condition, the switch 18a is set so that the switch 17 and the output end of the power amplifier 18 are in the connected state. The attenuations of both the variable attenuators 19 and 21 are set to minimum, and the selector switch 32 is set so that the CPU 33 and the detection element 31b are in the connected state.

Upon completion of the above-noted initial settings, when a wireless signal transmitted from outside is received by the antenna AT, the received signal is output. The received signal output from the antenna AT passes sequentially through the extension cable CB2, the cable CB1, and then the input/output terminal T2, after which it is input to the power divider PD. The signal input to the power divider PD is distributed to the receiving circuit 20 and the transmitting circuit 10.

The signal distributed to the receiving circuit 20 is input to the variable attenuator 21. In this case, because the attenuation of the variable attenuator 21 is set to minimum, the received signal input to the variable attenuator 21 passes through the variable attenuator 21 with almost no attenuation. The received signal that has passed through the variable attenuator 21, after being amplified by the low-noise amplifier circuit 22, is demodulated by the I/Q demodulator 23.

On the other hand, the signal distributed to the transmitting circuit 10 is input to the variable attenuator 19. In this case, because the attenuation of the variable attenuator 19 is set to minimum, the same as the variable attenuator 21, the receiving signal input to the variable attenuator 19 passes through the variable attenuator 19 with almost no attenuation. The received signal that has passed through the variable attenuator 19 detours around the power amplifier 18 and is input to the bidirectional coupler 16, passing sequentially through the switch 18a and then the switch 17.

Of the signal input to the bidirectional coupler 16, the isolator 15 cut off the signal that has passed through the bidirectional coupler 16. The signal split off at the bidirectional coupler 16 propagates from the pattern P12 to the pattern P13 shown in FIG. 2, and is detected by the detection element 31b provided in the self-diagnosis circuit 30. The detection result of the detection element 31b is input to the CPU 33 via the selector switch 32, and is used in judging whether or not the signal level of the received signal is proper and in diagnosis for an abnormality in the follower stage circuit 10b. For example, if the detection result of the detection element 31b exceeds a pre-established upper threshold, the CPU 33 judges that an abnormality has occurred in the follower stage circuit 10b.

If a judgment is made that an abnormality has occurred in the follower stage circuit 10b, the CPU 33 places the signal transmission path L between the bidirectional coupler 16 and the power amplifier 18 in the disconnected state, for example, by placing the switch 17 in the open condition. Then, a notification signal is input from the input terminal T1 so as to cause the sending of the notification signal using the pattern P12 of the bidirectional coupler 16, which functions as a microstrip antenna.

As described above, in the present embodiment, a signal that propagates from the input terminal T1 toward the input/output terminal T2 along the signal transmission path L is detected by the detection element 31a, and a signal that propagates from the input/output terminal T2 toward the input terminal T1 along the signal transmission path L is detected by the detection element 31b. The CPU 33 then, in response to the detection result of the detection element 31a, diagnoses for an abnormality in the previous stage circuit 10a and, in response to the detection result of the detection element 31b, diagnoses for an abnormality in the follower stage circuit 10b. As a result, diagnosis can be done for an abnormality not only in the previous stage circuit 10a, but also in the follower stage circuit 10b.

In the present embodiment, when the switch 17 is in the closed condition, it functions as the signal transmission path L, and when the switch 17 is in the open condition, it forms the pattern P12 that functions as a microstrip antenna as a part of the bidirectional coupler 16. Then, using the sending of the notification signal is done using antenna AT or is done without using the antenna AT, by using the pattern P12 that functions as a microstrip antenna. As a result, even if the wireless communication device 1 is disposed at a distance, it is possible to easily know of the occurrence of an abnormality by the sending of a notification signal. Also, even should a problem occur in the antenna AT, because a notification signal is sent using the pattern P12, which functions as a microstrip antenna, it is possible to know of the occurrence of an abnormality.

Also, in the present embodiment, if some abnormality occurs in the wireless communication apparatus 1, it is possible to parse between an abnormality in the previous stage circuit 10a and an abnormality in the follower stage circuit 10b. As a result, identification of the cause of an abnormality is facilitated, making it possible to reduce the time and cost required for repair and the like.

Second Embodiment

Figure 3:
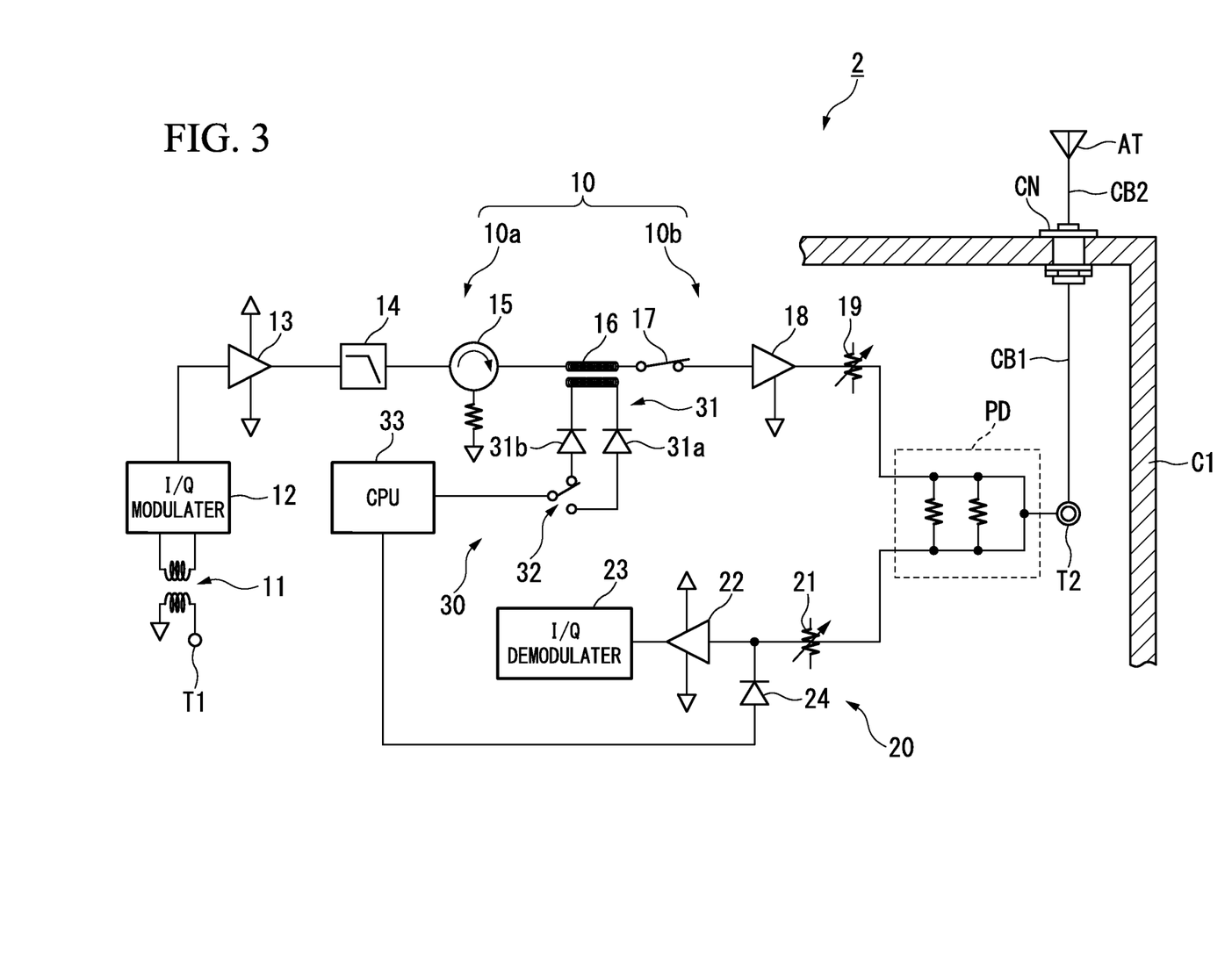
FIG. 3 is a block diagram showing the constitution of the main parts of a wireless communication apparatus having a self-diagnosis circuit according to a second embodiment of the present invention.

FIG. 3 is a block diagram showing the constitution of the main parts of a wireless communication apparatus having a self-diagnosis circuit according to the second embodiment of the present invention. In FIG. 3, blocks that are the same as those in FIG. 1 are assigned the same reference symbols. As shown in FIG. 3, a wireless communication apparatus 2 of the present embodiment has a detection element 24 (detection circuit) in the receiving circuit 20, and uses the result of the detection element 24 to detect the existence or non-existence of an abnormality in the circuit (high-frequency circuit) made up of the receiving circuit 20 and the circuitry that includes the power divider PD and the antenna AT (one part of the follower stage circuit 10b in the first embodiment).

The detection element 24 is a detection element similar to the detection elements 31a and 31b provided in the detector 31, and detects a signal input to the receiving circuit 20. Although the example shown in FIG. 3 is one in which the detection element 24 is connected between the variable attenuator 21 and the low-noise amplifier circuit 22, the detection element 24 may be connected between the I/Q modulator 23 and the low-noise amplifier circuit 22, or between the power divider PD and the variable attenuator 21. Also, as shown in FIG. 3, in the present embodiment, the switch 18a of the transmitting circuit 10 is omitted.

Next, the operation of the wireless communication apparatus 2 in the above-noted constitution will be described. Although the operation of the wireless communication apparatus 2 is generally divided into the transmission operation and the receiving operation same as the wireless communication device 1 described in the first embodiment, because the transmission operation of the wireless communication apparatus 2 is the same as the transmission operation of the wireless communication device 1, in the following the receiving operation of the wireless communication apparatus 2 will be described.

Receiving Operation

When the receiving operation begins, the initial settings are first performed by control from the CPU 33. Specifically, the switch 17 is set to the closed condition, similar to the first embodiment, with the attenuation of the variable attenuator 19 being set to maximum and the attenuation of the variable attenuator 21 being set to minimum. Because the detection elements 31a and 31b of the detector 31 are not used, the setting of the selector switch 32 may be either so that the CPU 33 and the detection element 31a are in the connected state or so that the CPU 33 and the detection element 31b are in the connected state.

Upon completion of the above-noted initial settings, when a wireless signal transmitted from outside is received by the antenna AT, the received signal is output. The received signal output from the antenna AT passes sequentially through the extension cable CB2, the cable CB1, and then the input/output terminal T2, after which it is input to the power divider PD. The signal input to the power divider PD is distributed to the receiving circuit 20 and the transmitting circuit 10.

Because the attenuation of the variable attenuator 19 is set to maximum, the signal distributed to the transmitting circuit 10 is almost completely attenuated. In contrast, the signal distributed to the receiving circuit 20 is input to the variable attenuator 21. In this case, because the attenuation of the variable attenuator 21 is set to minimum the received signal input to the variable attenuator 21 passes through the variable attenuator 21 with almost no attenuation. The received signal that has passed through the variable attenuator 21, after being amplified by the low-noise amplifier circuit 22, is demodulated by the I/Q demodulator 23.

The received signal that has passed through the variable attenuator 21 is detected by the detection element 24. The detection result of the detection element 24 is input to the CPU 33, and used in judging whether or not the signal level of the received signal is proper, and in diagnosing whether an abnormality has occurred in the follower stage circuit 10b. For example, if the detection result of the detection element 24 exceeds a pre-established upper threshold, the CPU 33 judges that an abnormality has occurred in the follower stage circuit 10b.

If a judgment is made that an abnormality has occurred in the follower stage circuit 10b, the CPU 33, similar to the first embodiment, places the switch 17 in the open condition, thereby placing the signal transmission path L between the bidirectional coupler 16 and the power amplifile18 in the disconnected state. By input of a notification signal from the input terminal T1, the notification signal is caused to be sent using the pattern P12 of the bidirectional coupler 16, which functions as a microstrip antenna.

As described above, in the present embodiment, the received signal that is output from the antenna AT and that is input to the receiving circuit 20 via the power divider PD is detected by the detection element 24. Then, the CPU 33, in response to the detection result of the detection element 24, diagnoses for an abnormality in the high-frequency circuit made up of the antenna AT, the power divider PD, and the receiving circuit 20 and the like. As a result, it is possible to diagnose for an abnormality not only in the previous stage circuit 10a, but also in a part (the circuit made up of the antenna AT, the power divider PD, and the like) of the follower stage circuit 10b.

In the present embodiment as well, similar to the first embodiment, even if the wireless communication apparatus 2 is disposed at a distance, it is easy to know of the occurrence of an abnormality by the sending of a notification signal. Even should a problem occur in the antenna AT, it is possible to send the notification signal by using the pattern P12, which functions as a microstrip antenna. Additionally, in the present embodiment as well, it is easy to identify the cause of an abnormality, making it possible to reduce the time and cost required for repair and the like.

Third Embodiment

Figure 4:
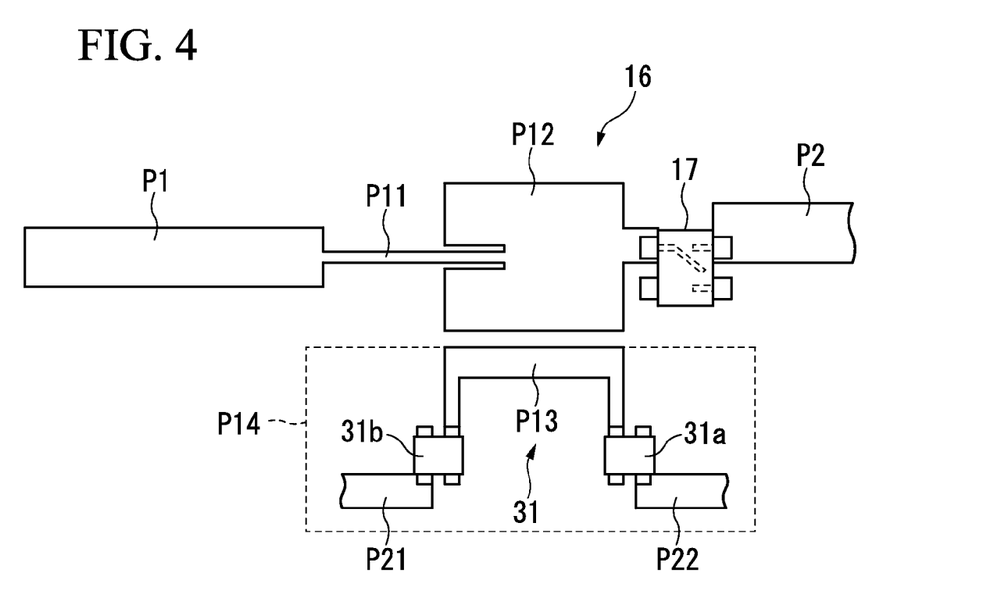
FIG. 4 is a plan view showing the constitution of a detector 31 in the third embodiment of the present invention.

FIG. 4 is a plan view showing the constitution of the detector 31 in the third embodiment of the present invention. In FIG. 4, elements that are the same as shown in FIG. 2 are assigned the same reference symbols. The overall constitution of the wireless communication apparatus is the same as the overall constitution of the wireless communication apparatuses 1 and 2 shown in FIG. 1 or FIG. 3. As shown in FIG. 4, the detector 31 in the present embodiment has a CRLH (composite right-and-left-handed) transmission line P14 (third pattern), the electromagnetic coupling between the patterns P12 and P13 forming the bidirectional coupler 16 being varied, and the efficiency of radiating the notification signal from the pattern P12 that functions as a microstrip antenna being increased.

The CRLH transmission line P14 is a rectangular pattern formed on an inner layer or an outer layer of the board (for example, a multilayer board) on which the pattern P13 is formed in the condition of overlaying with the pattern P13 when it is viewed in plan-view manner. The CRLH transmission line P14 is a transmission line for the purpose of implementing the function of a metamaterial (an artificial material exhibiting a behavior, with respect to a high-frequency signal, not exhibited in substances found in nature), enabling, under control of the CPU 33, a change of the dielectric constant of the board on which the pattern P13 is formed, thereby enabling dynamic variation of the electromagnetic coupling between the patterns P12 and P13 forming the bidirectional coupler 16.

In the above-noted constitution, if the pattern P12 of the bidirectional coupler 16 is caused to function as a microstrip antenna, the CPU 33 places the switch 17 in the open condition, thereby placing the signal transmission path L between the bidirectional coupler 16 and the power amplifier 18 in the disconnected state, and controls the CRLH transmission line P14. When this is done, the dielectric constant of the board on which the pattern P13 is formed is varied, so as to weaken the electromagnetic coupling between the patterns P12 and P13 forming the bidirectional coupler 16. As a result, because the pattern P12 that functions as a microstrip antenna is maintained in a high-impedance condition, the notification signal can be efficiently radiated from the pattern P12.

As described above, in the present embodiment, because the CRLH transmission line P14 is provided in the detector 31 and the electromagnetic coupling between the patterns P12 and P13 forming the bidirectional coupler 16 is dynamically varied, the efficiency of radiating the notification signal from the pattern P12 functioning as a microstrip antenna can be increased. Also, the overall constitution of the wireless communication apparatus in the present embodiment is the same as the overall constitution of the wireless communication apparatuses 1 and 2 shown in FIG. 1 or FIG. 3. For this reason, similar to the first and second embodiments, diagnosis can be done for an abnormality not only in the previous stage circuit 10a, but also in the follower stage circuit 10b (or a part of the follower stage circuit 10b), making it easy to know of the occurrence of an abnormality, thereby further enabling the reduction of the time and cost required for repair and the like.

The bidirectional coupler 16 can be implemented as a single chip or as a single module. The bidirectional coupler 16 and the detection elements 31a and 31b may be implemented as a single chip or a single module, and, in addition to the bidirectional coupler 16 and the detection elements 31a and 31b, the switch 17 may be implemented as a single chip or a single module. In addition to these elements, circuits that include the transmitting circuit 10, the receiving circuit 20, the self-diagnosis circuit 30, and the power divider PD may be implemented as a single chip or a single module.

Although the foregoing has been a description of the self-diagnosis circuit according to embodiments of the present invention, the present invention is not restricted to the above-noted embodiments, and can be freely modified within the scope thereof. For example, in the above-noted embodiments, although the description has been of an example in which a self-diagnosis circuit that diagnoses for an abnormality in a wireless communication apparatus 1 provided in a wireless field device, the self-diagnosis circuit of the present invention can diagnose for an abnormality in various wireless communication apparatuses capable of wireless communication.

As used herein, the following directional terms "forward, rearward, above, downward, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device includes hardware with or without software that is constructed and/or programmed to carry out the desired function.

The embodiments of methods, software, firmware or codes described above may be implemented by instructions or codes stored on a machine-accessible or machine readable medium. The instructions or codes are executable by a processing element or processing unit. The machine-accessible/readable medium may include, but is not limited to, any mechanisms that provide, store and/or transmit information in a form readable by a machine, such as a computer or electronic system. In some cases, the machine-accessible/readable medium may include, but is not limited to, random-access memories (RAMs), such as static RAM (SRAM) or dynamic RAM (DRAM), read-only memory (ROM), magnetic or optical storage medium and flash memory devices. In other cases, the machine-accessible/readable medium may include, but is not limited to, any mechanism that receives, copies, stores, transmits, or otherwise manipulates electrical, optical, acoustical or other form of propagated signals such as carrier waves, infrared signals, digital signals, including the embodiments of methods, software, firmware or code set forth above.

Furthermore, the particular features, structures, or characteristics may be combined in any suitable manner in one or more embodiments.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

It is apparent that the present invention is not limited to the above embodiments, but may be modified and changed without departing from the scope and spirit of the invention.

What is claimed is:

1. A self-diagnosis circuit that is coupled to a signal transmission path between input/output part for a high-frequency signal and that is configured to diagnose a high-frequency circuit using a signal that propagates along the signal transmission path, the self-diagnosis circuit comprising:
   a detector configured to detect the high-frequency signal propagating along the signal transmission path from the output part toward the input part; and
   a diagnosis unit configured to diagnose for an abnormality in a follower stage of the high-frequency circuit disposed between a coupling part of the self-diagnosis circuit with respect to the signal transmission path and the output part, in accordance with a detection result of the detector.

2. The self-diagnosis circuit according to claim 1, wherein the diagnosis unit is configured to use the detection result of the detector to determine reflection characteristics of the high-frequency signal that has propagated from the input part in the follower stage of the high-frequency circuit, and to diagnose for the abnormality in the follower stage of the high-frequency circuit, based on the reflection characteristics.

3. The self-diagnosis circuit according to claim 1, wherein the detector comprises:
   a first pattern formed on the signal transmission path and configured to function as an antenna that radiates a high-frequency signal propagating along the signal transmission path;
   a second pattern that is electromagnetically coupled to the first pattern; and
   a detection element configured to detect the high-frequency signal propagated from the first pattern to the second pattern.

4. The self-diagnosis circuit according to claim 2, wherein the detector comprises:
   a first pattern formed on the signal transmission path and configured to function as an antenna that radiates a high-frequency signal propagating along the signal transmission path;
   a second pattern that is electromagnetically coupled to the first pattern; and
   a detection element configured to detect the high-frequency signal propagated from the first pattern to the second pattern.

5. The self-diagnosis circuit according to claim 3, further comprising:
   a switch configured to establish a connected state or a disconnected state between an end part in the output part side of the first pattern and the signal transmission path,
   wherein, if an abnormality is diagnosed in the follower stage of the high-frequency circuit, the diagnosis unit controls the switch so as to establish the disconnected state between the end part in the output part side of the first pattern and the signal transmission path, to cause the first pattern to function as an antenna.

6. The self-diagnosis circuit according to claim 4, further comprising:
a switch configured to establish a connected state or a disconnected state between an end part in the output part side of the first pattern and the signal transmission path,
wherein, if an abnormality is diagnosed in the follower stage of the high-frequency circuit, the diagnosis unit controls the switch so as to establish the disconnected state between the end part in the output part side of the first pattern and the signal transmission path, to cause the first pattern to function as an antenna.

7. The self-diagnosis circuit according to claim 3, wherein the detector has a third pattern that is configured to change an electromagnetic coupling force of the second pattern with respect to the first pattern.

8. The self-diagnosis circuit according to claim 5, wherein the detector has a third pattern that is configured to change an electromagnetic coupling force of the second pattern with respect to the first pattern.

9. The self-diagnosis circuit according to claim 7, wherein, if the diagnosis unit diagnoses an abnormality in the follower stage of the high-frequency circuit, the diagnosis unit uses the third pattern to weaken an electromagnetic coupling force of the second pattern with respect to the first pattern.

10. The self-diagnosis circuit according to claim 8, wherein, if the diagnosis unit diagnoses an abnormality in the follower stage of the high-frequency circuit, the diagnosis unit uses the third pattern to weaken the electromagnetic coupling force of the second pattern with respect to the first pattern.

11. The self-diagnosis circuit according to claim 1, wherein
the detector is configured to detect a high-frequency signal propagating along the signal transmission path from the input part toward the output part, and
the diagnosis unit determines the transmission characteristics of the previous stage of the high-frequency circuit disposed between the coupling part of the self-diagnosis circuit with respect to the signal transmission path and the input part thereof, using the detection result of the detector, and to diagnose for an abnormality in the previous stage of the high-frequency circuit, based on the transmission characteristics.

12. The self-diagnosis circuit according to claim 2, wherein
the detector is configured to detect a high-frequency signal propagating along the signal transmission path from the input part toward the output part, and
the diagnosis unit determines the transmission characteristics of the previous stage of the high-frequency circuit disposed between the coupling part of the self-diagnosis circuit with respect to the signal transmission path and the input part thereof, using the detection result of the detector, and to diagnose for an abnormality in the previous stage of the high-frequency circuit, based on the transmission characteristics.

13. The self-diagnosis circuit according to claim 3, wherein
the detector is configured to detect a high-frequency signal propagating along the signal transmission path from the input part toward the output part, and
the diagnosis unit determines the transmission characteristics of the previous stage of the high-frequency circuit disposed between the coupling part of the self-diagnosis circuit with respect to the signal transmission path and the input part thereof, using the detection result of the detector, and to diagnose for an abnormality in the previous stage of the high-frequency circuit, based on the transmission characteristics.

14. The self-diagnosis circuit according to claim 5, wherein
the detector is configured to detect a high-frequency signal propagating along the signal transmission path from the input part toward the output part, and
the diagnosis unit determines the transmission characteristics of the previous stage of the high-frequency circuit disposed between the coupling part of the self-diagnosis circuit with respect to the signal transmission path and the input part thereof, using the detection result of the detector, and to diagnose for an abnormality in the previous stage of the high-frequency circuit, based on the transmission characteristics.

15. The self-diagnosis circuit according to claim 7, wherein
the detector is configured to detect a high-frequency signal propagating along the signal transmission path from the input part toward the output part, and
the diagnosis unit determines the transmission characteristics of the previous stage of the high-frequency circuit disposed between the coupling part of the self-diagnosis circuit with respect to the signal transmission path and the input part thereof, using the detection result of the detector, and to diagnose for an abnormality in the previous stage of the high-frequency circuit, based on the transmission characteristics.

16. The self-diagnosis circuit according to claim 1, wherein
the output part is an input/output part for allowing an input of a high frequency signal, in addition to for outputting a high-frequency signal,
wherein the self-diagnosis circuit further comprises:
a detection circuit configured to detect a high-frequency signal input from the input/output part and propagated along at least a part of the follower stage of the high-frequency circuit.

17. The self-diagnosis circuit according to claim 2, wherein
the output part is an input/output part for allowing an input of a high frequency signal, in addition to for outputting a high-frequency signal,
wherein the self-diagnosis circuit further comprises:
a detection circuit configured to detect a high-frequency signal input from the input/output part and propagated along at least a part of the follower stage of the high-frequency circuit.

18. The self-diagnosis circuit according to claim 3, wherein
the output part is an input/output part for allowing an input of a high frequency signal, in addition to for outputting a high-frequency signal,
wherein the self-diagnosis circuit further comprises:
a detection circuit configured to detect a high-frequency signal input from the input/output part and propagated along at least a part of the follower stage of the high-frequency circuit.

19. The self-diagnosis circuit according to claim 5, wherein
the output part is an input/output part for allowing an input of a high frequency signal, in addition to for outputting a high-frequency signal,
wherein the self-diagnosis circuit further comprises:

a detection circuit configured to detect a high-frequency signal input from the input/output part and propagated along at least a part of the follower stage of the high-frequency circuit.

20. The self-diagnosis circuit according to claim 1, wherein at least the detector is formed in a single chip or a module.

* * * * *